United States Patent [19]
Namngani

[11] Patent Number: 5,769,441
[45] Date of Patent: Jun. 23, 1998

[54] VEHICLE HAVING TWO AXIALLY SPACED RELATIVELY MOVABLE WHEELS

[76] Inventor: Abdulatif Namngani, P.O. Box 13925, Jeddah 21414, Saudi Arabia

[21] Appl. No.: 530,086

[22] Filed: Sep. 19, 1995

[51] Int. Cl.$^6$ ................................................ B62K 17/00
[52] U.S. Cl. .......................... 280/208; 280/211; 280/236; 280/661; 188/24.11; 188/72.7; 188/2 D
[58] Field of Search .................................. 188/20, 24.11, 188/24.12, 24.22, 24.21, 72.7; 303/113.1, 116.3; 280/205, 206, 208, 207, 47.2, 236, 237, 238, 250.1, 260, 259, 661, 204, 209, 210, 211; 301/1; 74/502.2, 502.4

[56] References Cited

U.S. PATENT DOCUMENTS

| | | |
|---|---|---|
| 88,930 | 4/1869 | White . |
| 90,546 | 5/1869 | Huntington . |
| 212,492 | 2/1879 | Otto . |
| 250,960 | 12/1881 | Otto . |
| 286,593 | 10/1883 | Deputy . |
| 352,885 | 11/1886 | Otto . |
| 396,584 | 1/1889 | Maetzel . |
| 601,107 | 3/1898 | Simpier . |
| 2,824,597 | 2/1958 | Lerman ..................................... 155/30 |
| 3,001,601 | 9/1961 | Aghnides .................................. 180/75 |
| 3,014,547 | 12/1961 | Van Der Lely ........................... 180/75 |
| 3,143,362 | 8/1964 | Willsea .................................... 280/208 |
| 3,183,020 | 5/1965 | Hawver .................................... 280/208 |
| 3,695,375 | 10/1972 | Splawinski ............................... 180/29 |
| 3,765,466 | 10/1973 | Tsuruta ..................................... 152/210 |
| 4,057,127 | 11/1977 | Woodring ................................. 188/2 D |
| 4,350,227 | 9/1982 | Knoche ................................. 280/250.1 |
| 4,471,972 | 9/1984 | Young ................................... 280/250.1 |
| 4,497,502 | 2/1985 | Forbes et al. ............................ 280/282 |
| 4,648,615 | 3/1987 | Volin ..................................... 280/250.1 |
| 4,749,064 | 6/1988 | Jinno et al. ............................ 280/250.1 |
| 4,768,797 | 9/1988 | Friedrich ................................. 280/661 |
| 4,773,510 | 9/1988 | Sato ....................................... 188/2 D |
| 4,825,971 | 5/1989 | Bernstein ............................... 180/65.1 |
| 5,016,490 | 5/1991 | Jaksic ..................................... 188/2 D |
| 5,181,740 | 1/1993 | Horn ......................................... 180/21 |
| 5,431,255 | 7/1995 | Tsuchie .................................. 188/2 D |
| 5,435,583 | 7/1995 | Foster, Jr. ............................... 280/237 |
| 5,480,172 | 1/1996 | James ................................... 280/250.1 |

Primary Examiner—Brian L. Johnson
Assistant Examiner—Gary Savitt
Attorney, Agent, or Firm—Bacon & Thomas

[57] ABSTRACT

A parallel vehicle includes three main control systems. The first controls the position and angle of the two parallel wheels relative to a fixed chassis, enabling the wheels to be moved outwardly and inwardly and the camber varied for greater stability, aerodynamic effect, or turning. This first system may be mechanically or hydraulically actuated, but preferably is controlled by a pair of control members whose position relative to the chassis corresponds to the desired position of the wheels relative to the chassis in order to provide an intuitive control mechanism. The second system is the propulsion system which may, for example, take the form of a derailleur drive of the type used in bicycles, but with power from the propulsion system being transmitted to the wheels via a rotating cable and individual gearboxes for each wheel which permit the direction of the wheels to be reversed. Finally, a braking system includes a braking mechanism which can be individually controlled to separately brake the wheels for steering purposes or to brake both of the wheels at the same time.

58 Claims, 15 Drawing Sheets

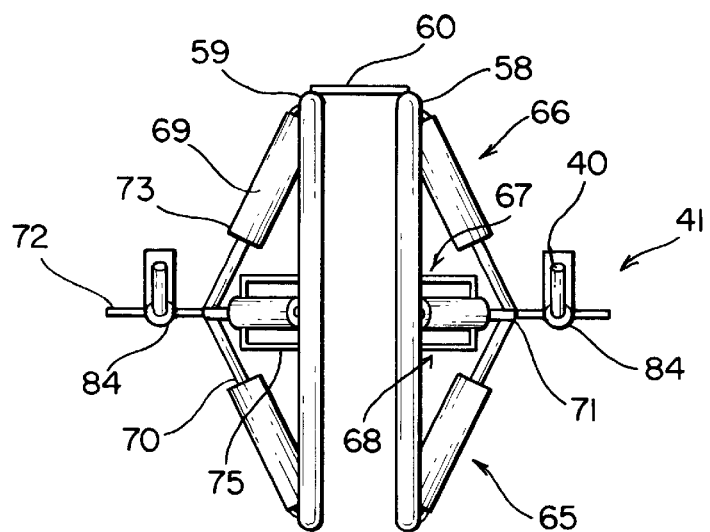
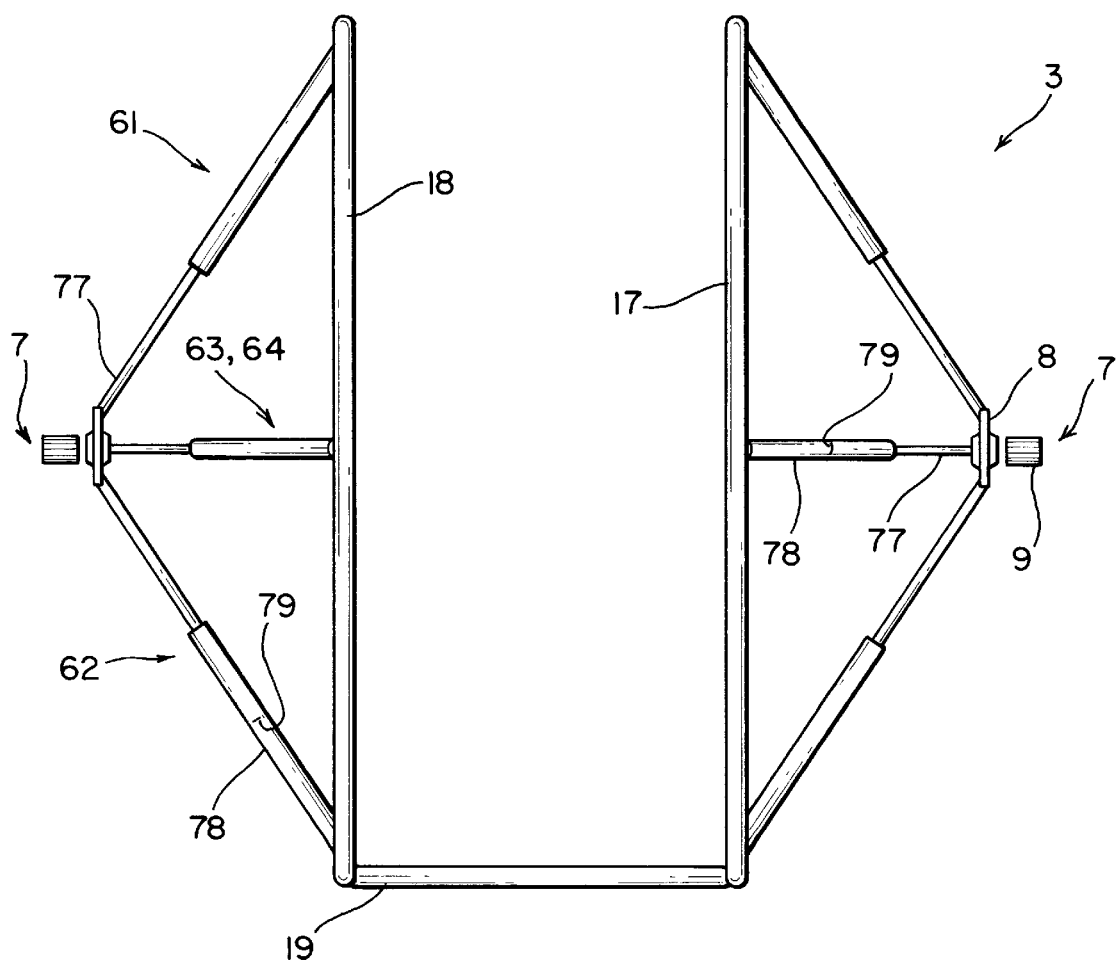
FIG. 6

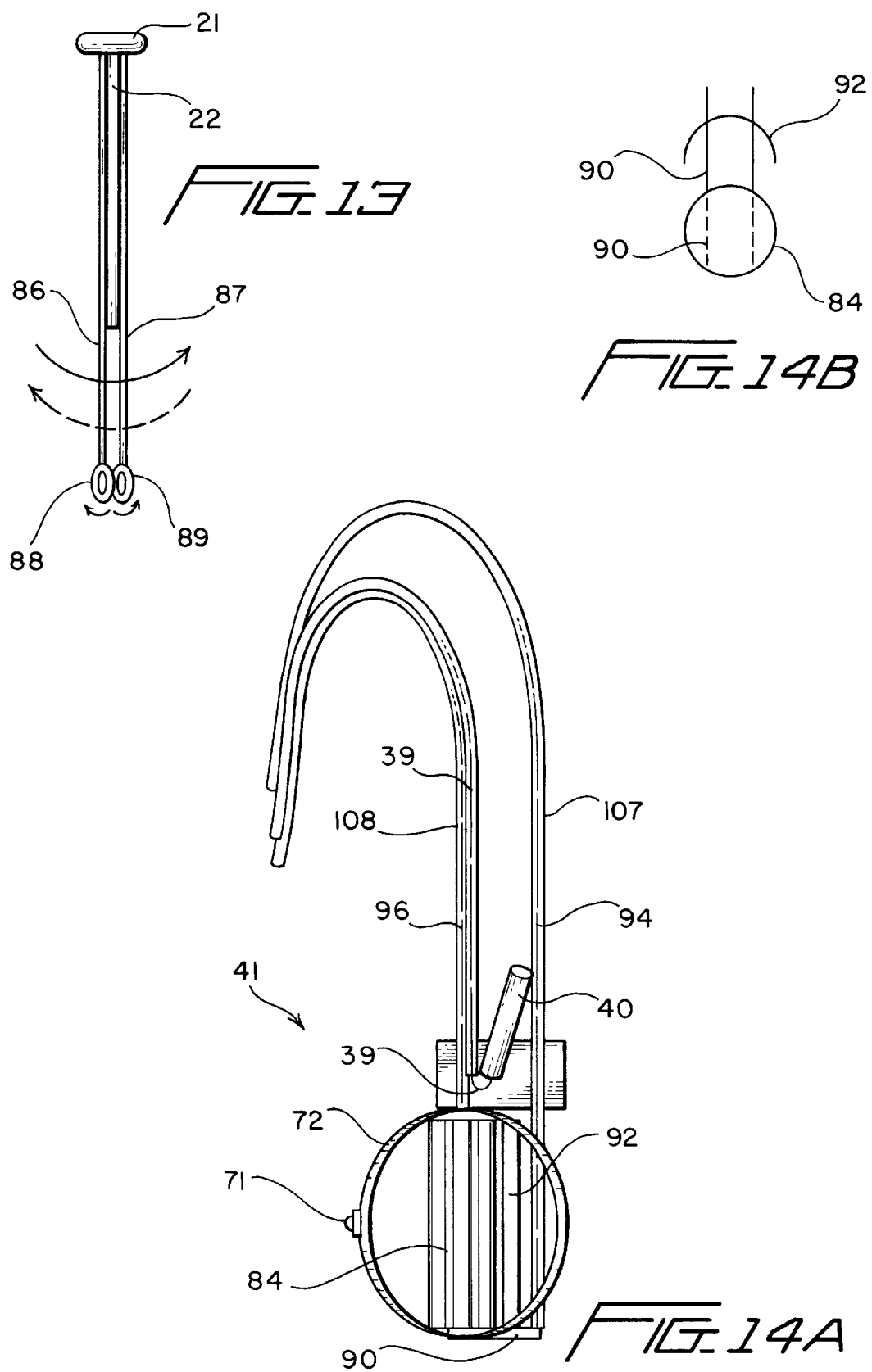

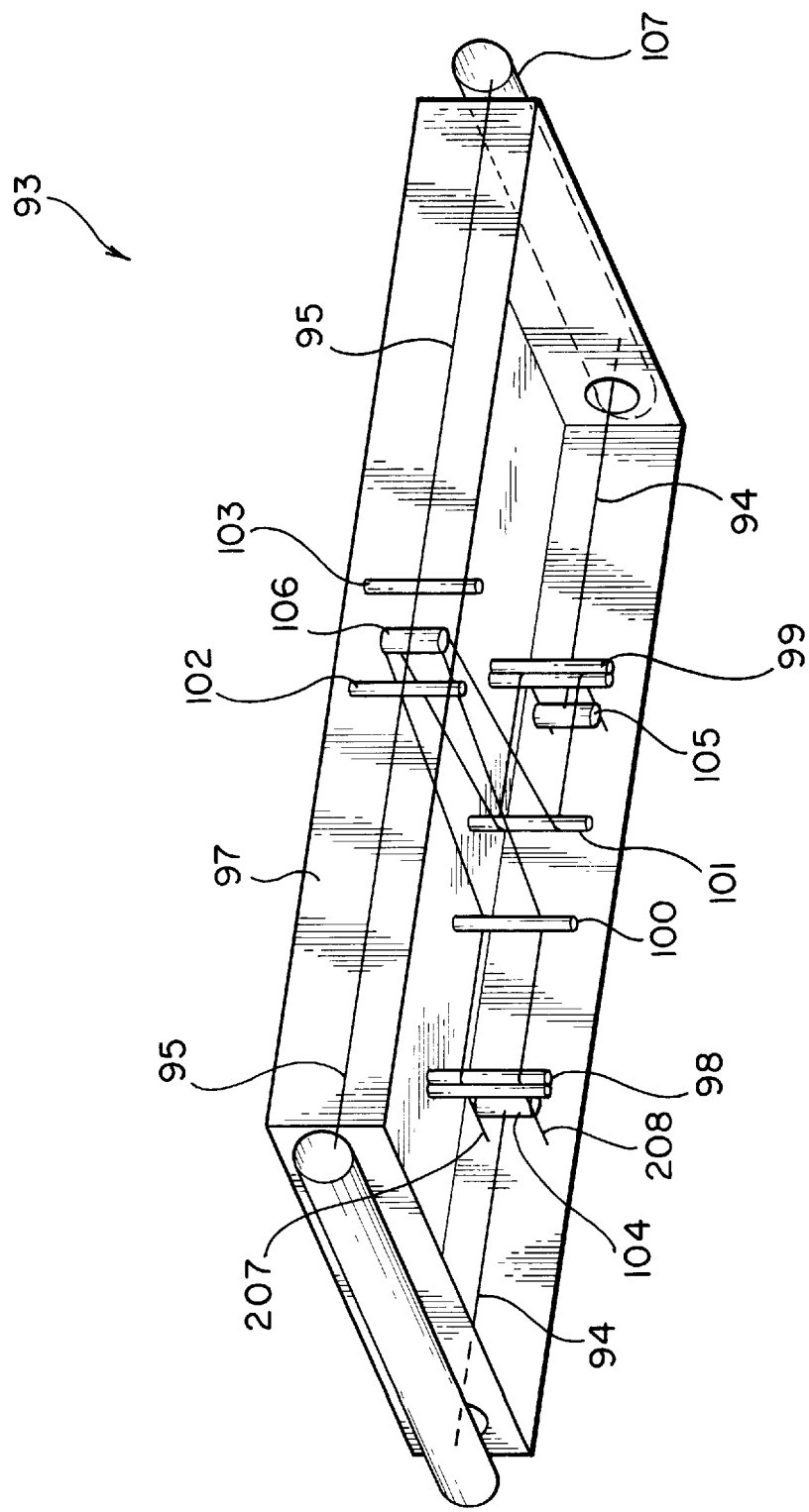

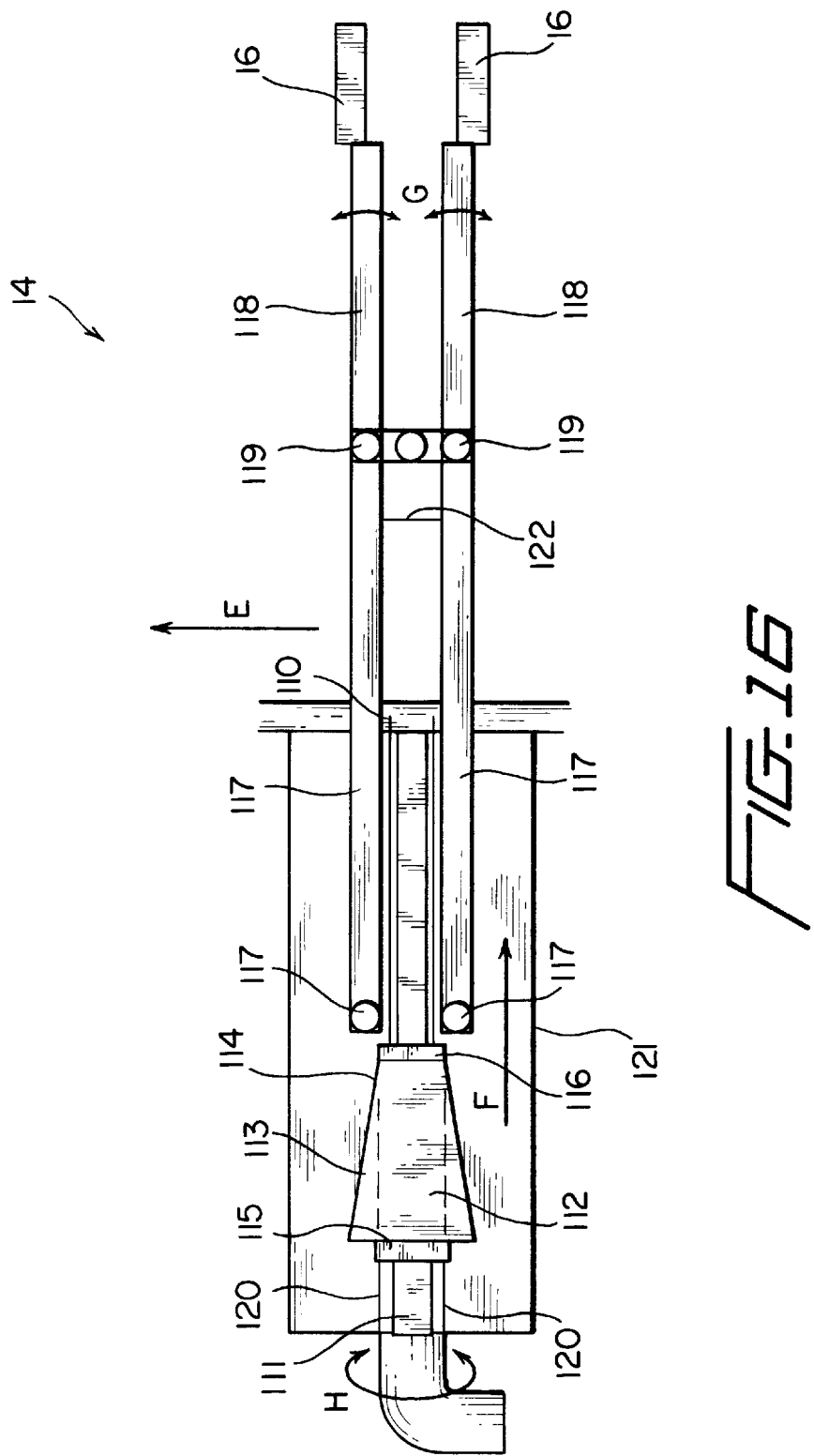

VEHICLE HAVING TWO AXIALLY SPACED RELATIVELY MOVABLE WHEELS

BACKGROUND OF THE INVENTION

1. Field of the Invention

This invention relates to a vehicle made up of two large wheels in parallel with each other rather than in the same plane as is the case with a bicycle. The rider is positioned between the wheels and below the center of gravity of the vehicle. The vehicle of the invention resembles a type of vehicle known as a "dicycle," but differs from the dicycle in that the wheels are not fixed relative to each other. Although the new type of vehicle of the invention is referred to herein as a parallel vehicle, the adjective parallel is not entirely accurate (non-coplanar would be more accurate) because the wheels can be tilted relative to each other, but is nevertheless used herein for purposes of convenience.

2. Description of Related Art

The "dicycle," although little known today, is not a new concept. Early in this century, a number of designs involving vehicles made up of two large parallely positioned wheels were proposed. Because of the large size of the wheels and the position of the rider between the wheels, this type of vehicle had obvious advantages of stability in comparison with bicycles. Nevertheless, the dicycle was relatively unwieldy and difficult to maneuver. As a result, the dicycle never attained the popularity of bicycles and soon faded into obscurity.

The present invention involves a new type of vehicle which shares with the dicycle the concept of the rider being positioned below the center of gravity between the two wheels of the vehicle, but which is far easier to maneuver and yet more aerodynamic than the prior vehicle known as the dicycle. The new vehicle includes the ability to easily move the wheels in and out and adjust the camber of the wheels for greater accessibility, i.e., ease of entrance mounting and dismounting, stability at low speeds, and aerodynamic properties at high speeds, the provision of reversible gear boxes on each wheel for improved turning ability, as well as numerous improvements to the steering, braking, and speed control systems.

Unlike the original dicycle concept, in which the wheels were fixed relative to each other, the parallel vehicle of the invention provides wheels which are independently translatable and rotatable relative to a fixed chassis in which the rider is positioned. To this unique suspension is added a state-of-the-art transmission and a novel independently controlled braking system for each wheel, resulting in a completely new and vastly superior type of parallel vehicle.

The following patents all show examples of "dicycles": U.S. Pat. Nos. 88,930; 90,546; 212,492; 250,960; 286,593; 352,885; 3,143,362; and 3,183,020. In addition, some of the concepts used in the dicycle are also used in other types of parallel two wheeled vehicles, such as wheelchairs, and thus the following patents may also be of interest: U.S. Pat. Nos. 396,854; 601,107; 3,001,601; 3,014,547; 3,695,375; 3,765,466; 2,824,597; and 4,825,971. None of these references even remotely suggests, however, the combinations of concepts which form the basis for the unique two wheeled vehicle of the present invention.

SUMMARY OF THE INVENTION

It is accordingly an objective of the invention to provide a parallel vehicle of the type in which the rider is seated below the center of gravity of the vehicle, between the two parallel wheels, and which includes improved propulsion, braking, and steering systems.

It is also an objective of the invention to provide a parallel vehicle of the type mentioned above in which the wheels are independently translatable and have an adjustable camber to provide greater accessibility, stability at low speeds, and a more aerodynamic profile at high speeds.

These objectives are achieved by providing a vehicle having axially spaced, generally parallel wheels between which is located a chassis arranged to accommodate a rider, and in which the wheels have a concave shape such that, in addition to providing a parallel configuration, the wheels can be completely brought together to enclose the rider, thereby presenting the profile of a single aerodynamically shaped wheel, or in which either the upper or lower portions of the wheels can be brought together in a V-shape or an inverted V-shape for greater maneuverability or stability as desired.

These objectives are further achieved, according to the preferred embodiment of the invention, by providing a vehicle having axially spaced, generally parallel wheels, between which is located a chassis arranged to accommodate a rider together with all necessary steering, propulsion, and braking controls, and in which the wheels are each independently movable relative to the chassis.

In one implementation of the preferred embodiment of the invention, the wheels of the parallel vehicle are connected to respective circular chassis members by four hydraulic cylinders having pistons therein, the position of the pistons determining the relative distance and angle of the wheels relative to the chassis. In this embodiment, a circular control sub-chassis is situated within the chassis and connected to a handle by cylinders hydraulically connected to the four hydraulic cylinders which support the wheels, such that movements of the handle relative to the control sub-chassis are translated into corresponding movements of a wheel hub relative to the main chassis, thus enabling the rider to easily and intuitively control the position of the wheels relative to the chassis in order to adjust the camber, raise and lower them, and move them further apart for stability and to permit ingress and egress or to bring them closer together to present a more aerodynamic profile. In a variation of this preferred implementation, the hydraulic cylinders are replaced by struts or rods respectively pivotally connected between a handle and slidable members on a control sub-chassis and between the wheel hub and slidable members on a main chassis, the respective slidable members being connected to each other by wires, and in a further variation of the preferred implementation, the wheel hub is directly moved by handles arranged to directly control a parallelogram type suspension link.

The preferred propulsion system is a pedal-driven system with a common derailleur type transmission coupled to an independently controllable clutch/reversing mechanism for each wheel, the output of the clutch/reversing mechanism being in the form of a rotating cable connected to the wheel hub by a worm gear, the pedal support, derailleur transmission, and independent gearboxes all being pivotally connected to the chassis by a camming mechanism which causes the pedals to pivot away from the wheel at the lowest point of their travel in order to permit the wheels to be brought together in order to provide an optimal aerodynamic profile at high speeds.

Braking is preferably provided by a cable system controlled by the main wheel position control handles which individually actuate brakes respectively situated on the two wheels to provide a differential wheel speed for maneuvering, and which also provides for common actuation by of both brakes by separate brake actuator handles provided adjacent the two main control handles. In an especially preferred embodiment of the invention, the braking mechanisms on each wheel are antilock brakes responsive both to applied braking pressure and to the wheel speed.

BRIEF DESCRIPTION OF THE DRAWINGS

FIG. 6 is a bottom view of the wheel positioning arrangement for the preferred parallel vehicle illustrated in FIGS. 1–3.

FIG. 13 is a perspective view showing an arrangement for pivoting the pedals of the propulsion system for the preferred parallel vehicle illustrated in FIGS. 1–3.

FIG. 14A is a perspective view showing one of the control handles used in the preferred parallel vehicle illustrated in FIGS. 1–3.

FIG. 14B is a top view of a portion of the control handle assembly shown in FIG. 14A.

FIG. 15 is a perspective view of a braking force distributor arrangement for the preferred parallel vehicle illustrated in FIGS. 1–3.

FIG. 16 is a side view of a preferred brake for the preferred parallel vehicle illustrated in FIGS. 1–3.

DETAILED DESCRIPTION OF THE PREFERRED EMBODIMENTS

Figure 1:
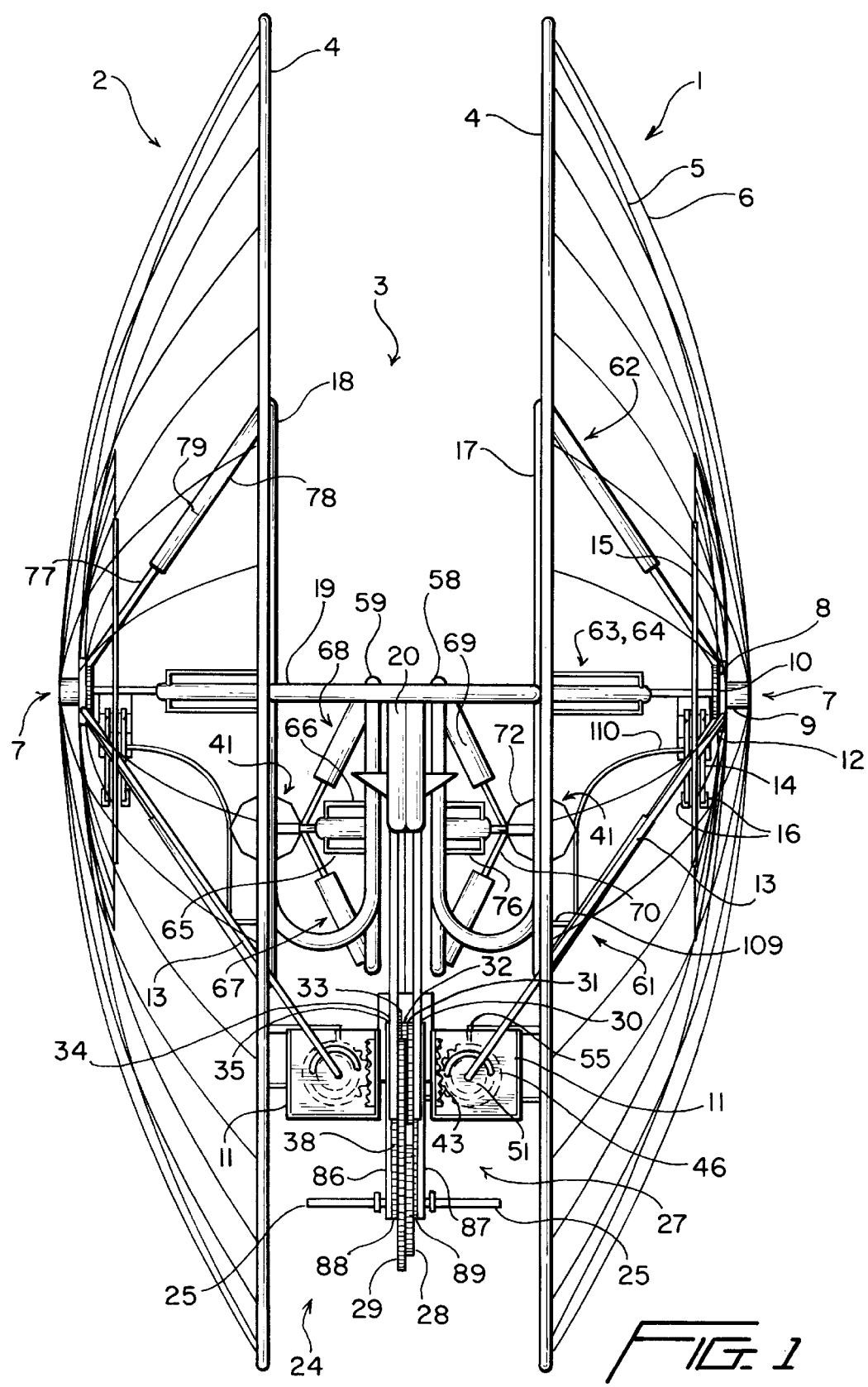
FIG. 1 is a rear view of a parallel vehicle constructed according to the principles of a first preferred embodiment of the invention.
Figure 2:
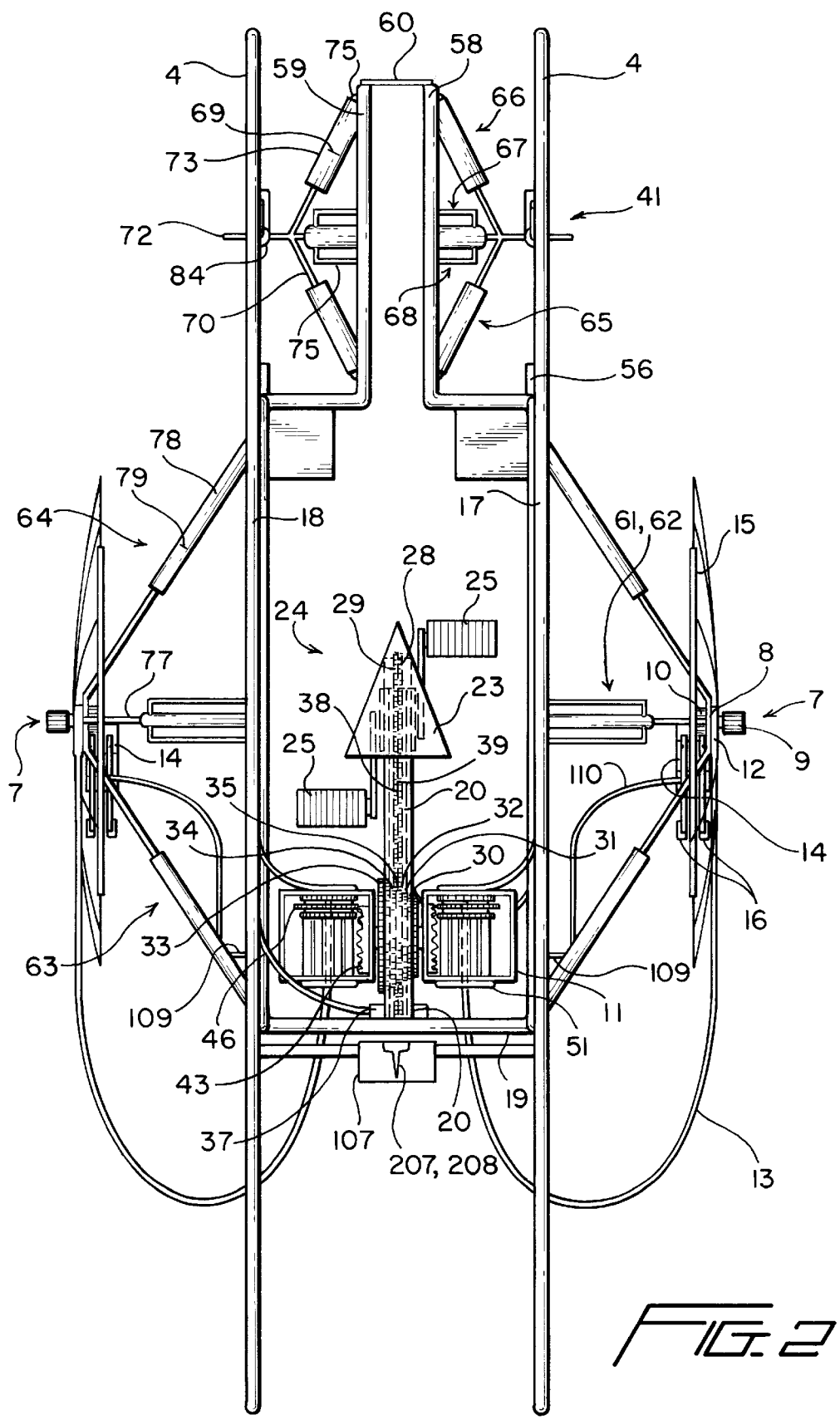
FIG. 2 is a top view of the preferred parallel vehicle illustrated in FIG. 1.
Figure 3:
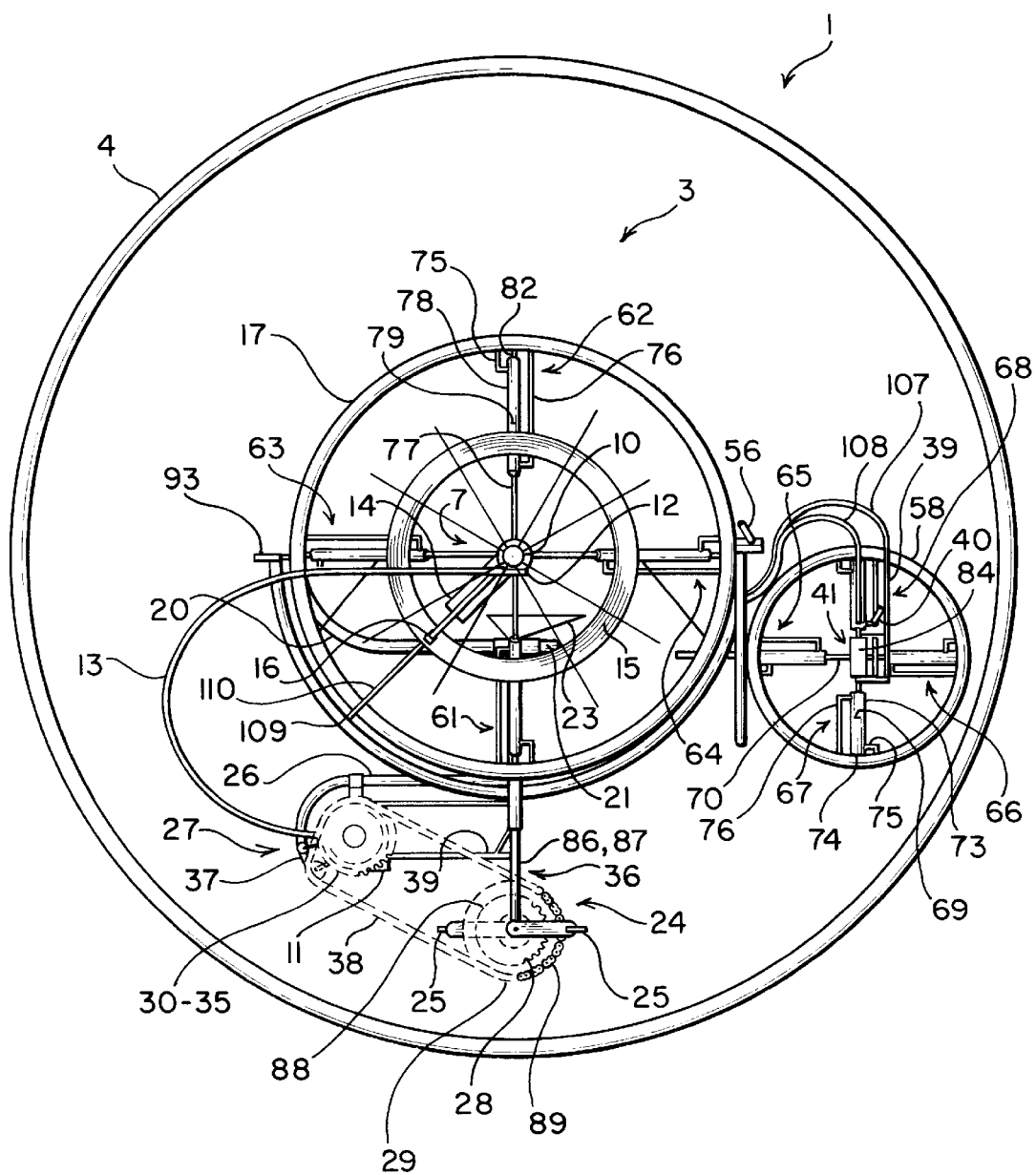
FIG. 3 is a side view of the preferred parallel vehicle illustrated in FIG. 1.

The overall layout of a parallel vehicle which embodies the principles of the invention is illustrated in FIGS. 1–3.

The major components of the parallel vehicle of this embodiment are the wheels 1, 2, a chassis 3 relative to which the wheels are arranged to move and in which the rider and various controls are supported, a wheel position control system, a steering system, a propulsion system, and a brake system. All of the components associated with the individual wheels on the two sides of the vehicle are identical, except for left/right symmetry, and thus in most cases only one of the components will be discussed.

The wheels 1, 2 of the preferred parallel vehicle include, as is conventional, a tire (not shown), a tire frame 4, inner spokes 5 and outer spokes 6, and a hub assembly 7 made up of a stationary portion 8, a shaft 9 which rotates within the stationary portion and to which the spokes are affixed, and a drive gear 10. In a departure from conventional practice, the wheels have a concave shape which permits the rider to be completely enclosed by the wheels, as will become apparent below, for the purpose of presenting a more aerodynamic profile at high speeds.

In a preferred embodiment of the invention, the stationary portion 8 is connected to the chassis solely by the aforementioned wheel position control system, described in more detail below, with power being transmitted to the drive gear 10 by a rotating cable connected to a gear box at one end and to a worm gear 12 in engagement with the drive gear at the other. Preferably, the power cable which rotates the wheels is enclosed within a conduit in the form of flexible tubing 13 arranged so as not to interfere with motion of the wheel and yet permit relative motion between the wheel and the chassis. Also attached to the stationary portion 8 of the wheel hub is a brake mechanism 14, described in more detail below, which cooperates with an annular brake disk 15 arranged to rotate with the wheel to transfer momentum from the disk and brake the vehicle when brake shoes 16 are applied against the disk.

Figure 12:
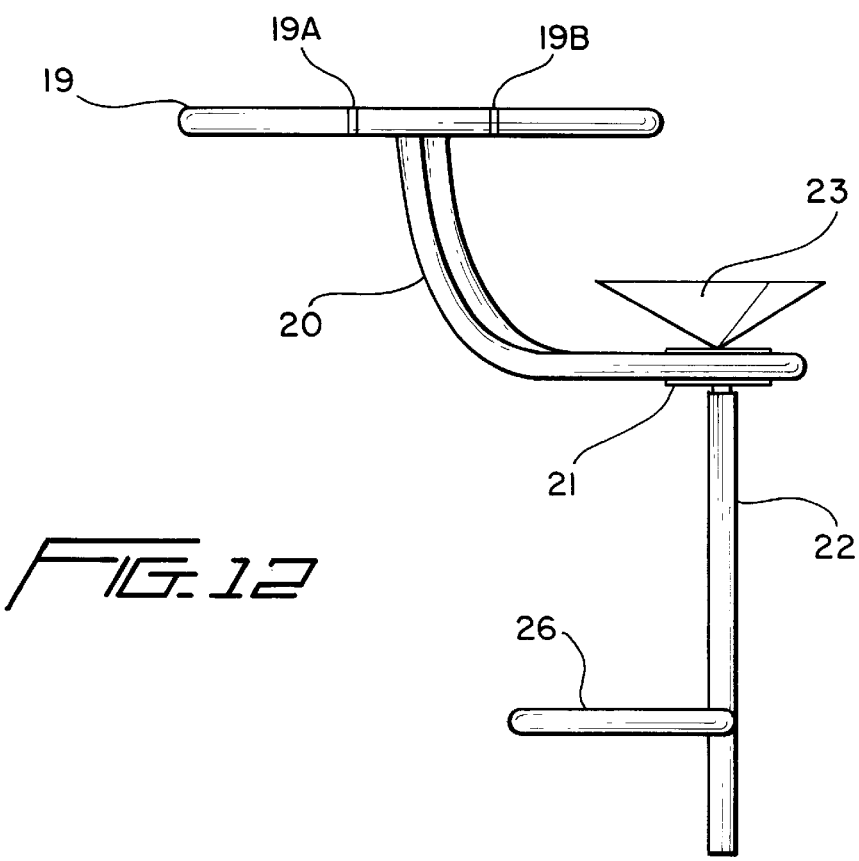
FIG. 12 is a perspective view showing the support arrangement for the seat and propulsion system of the preferred parallel vehicle illustrated in FIGS. 1–3.

The chassis 3 of the vehicle is made up of two large annular tubes 17,18 spaced apart by a cross-member 19, from which depends a pivotally mounted seat support 20, the seat support in turn supporting a pivot 21 from which extends a pedal mechanism support 22 and to which is attached seat or saddle 23, the pedal mechanism support 22 supporting a primary gear drive mechanism 24, pedals 25, and a secondary gear drive mechanism support 26, the secondary gear drive mechanism support 26 in turn supporting a secondary gear drive mechanism 27 and the gear boxes 11. Details of the support structure made up of supports 20, 22, and 26 are shown in FIG. 12. Because of the presence of pivot 21, supports 22 and 26, together with the pedals 25, primary gear drive mechanism 24, secondary gear drive mechanism 27, and gear boxes 11 are all free to pivot, for reasons which will be explained below, about a horizontal axis extending midway between the planes defined by annular frame members 17 and 18 of chassis 3. In addition, pivots 19A and 19B may also be provided for adjusting the cross-bar 19, while the pivot 21 could also be arranged to slide along the seat support 20.

As illustrated, primary and secondary gear drive mechanisms 24 and 27 form an essentially conventional derailleur system made up of two primary gears 28 and 29, six secondary gears 30–35, a primary gear changer 36 and a secondary gear changer 37, a chain or belt 38, and corresponding cables 39 and gear shifters 40 positioned on control handle assemblies 41, described in more detail below and illustrated in greater detail in FIG. 14. Although conventional, and therefore not described herein in detail, it will be appreciated by those skilled in the art that numerous other speed control or transmission systems may be substituted for the illustrated derailleur system.

Figure 11:
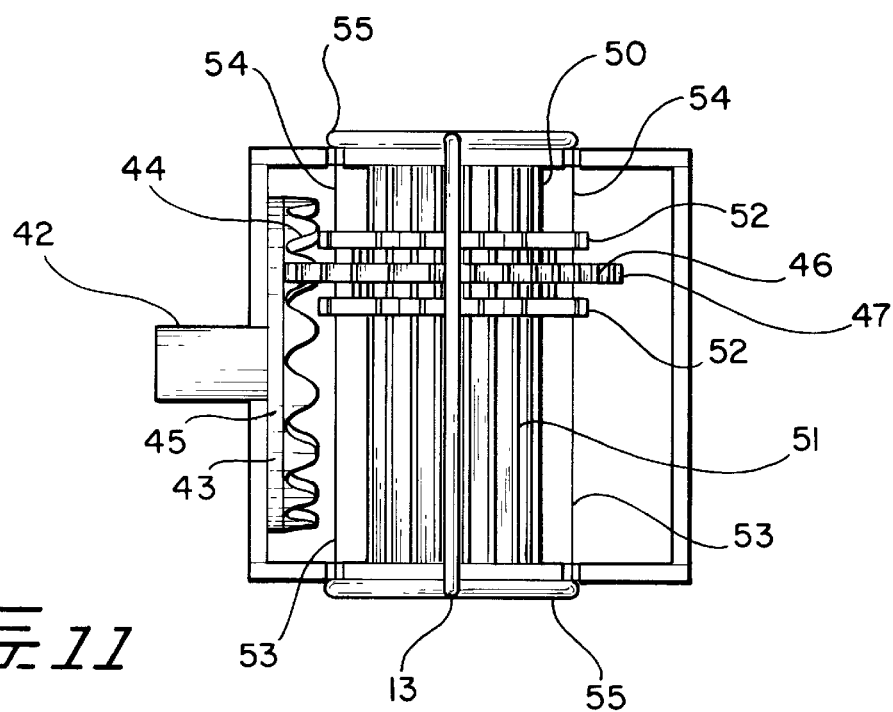
FIG. 11 is a top view showing the components used in one of the gearboxes used in the preferred parallel vehicle illustrated in FIGS. 1–3.

The output of the secondary gear drive mechanism 27 is provided by a shaft 42 connected, in the embodiment illustrated in FIGS. 1–3, to a gear 43 of the type having teeth 44 situated at right angles to the main gear disk 45, and arranged to engage a gear 46 whose axis is perpendicular to the shaft 42, as illustrated in FIG. 11. Both gear 43 and gear 46 are situated in gearbox 11, one of which is provided for each of the wheels 1,2. Gear 46 includes both external teeth 47 and internal teeth (not shown), with the internal teeth engaging the external teeth 50 of an elongated spur gear 51 so as to be axially slidable along the elongated gear 51. Gear 46 is mounted to rotate relative to a non-rotatable bracket assembly 52 to which are attached wires 53 and 54 arranged to respectively pull the bracket assembly 52, and consequently gear 46, in opposite directions along the elongated gear 51, wires 53 and 54 being connected through conduit 55 to direction reversing shift levers 56 mounted on the chassis 3.

Thus, shaft 42 and gear 43 form the input to a clutch/reversing mechanism which operates by causing gear 46 to move from one side of the input gear 43 to the other, the direction in which gear 46 rotates depending on which side of the input gear it is engaged with, gear 46 being disengaged from gear 43 at intermediate points, and the output of the clutch/reversing mechanism being provided by cable 13, which is connected to rotate with gear 46 and gear 51, and at the opposite end of which is the above-mentioned worm gear 12. This transmission enables the wheels to be moved forwards, backwards, or in opposite directions in response to rotation of the pedals in a single direction, enabling rapid turning of the vehicle, although those skilled in the art will appreciate that it may also be advantageous to make the individual gearbox mechanisms continuously variable so that the relative speed of the two wheels can be controlled as well as the direction.

A first embodiment of the wheel position subsystem will now be described with reference to FIGS. 1–6. Control is provided by relative movement of handle assemblies 41 and fixed sub-chassis 57. Fixed sub-chassis 57 is made up of two circular members 58 and 59, preferably in the form of tubes arranged to carry the various control wires, cables, and lines, and connected to each other by a crossbar 60.

Figure 17:
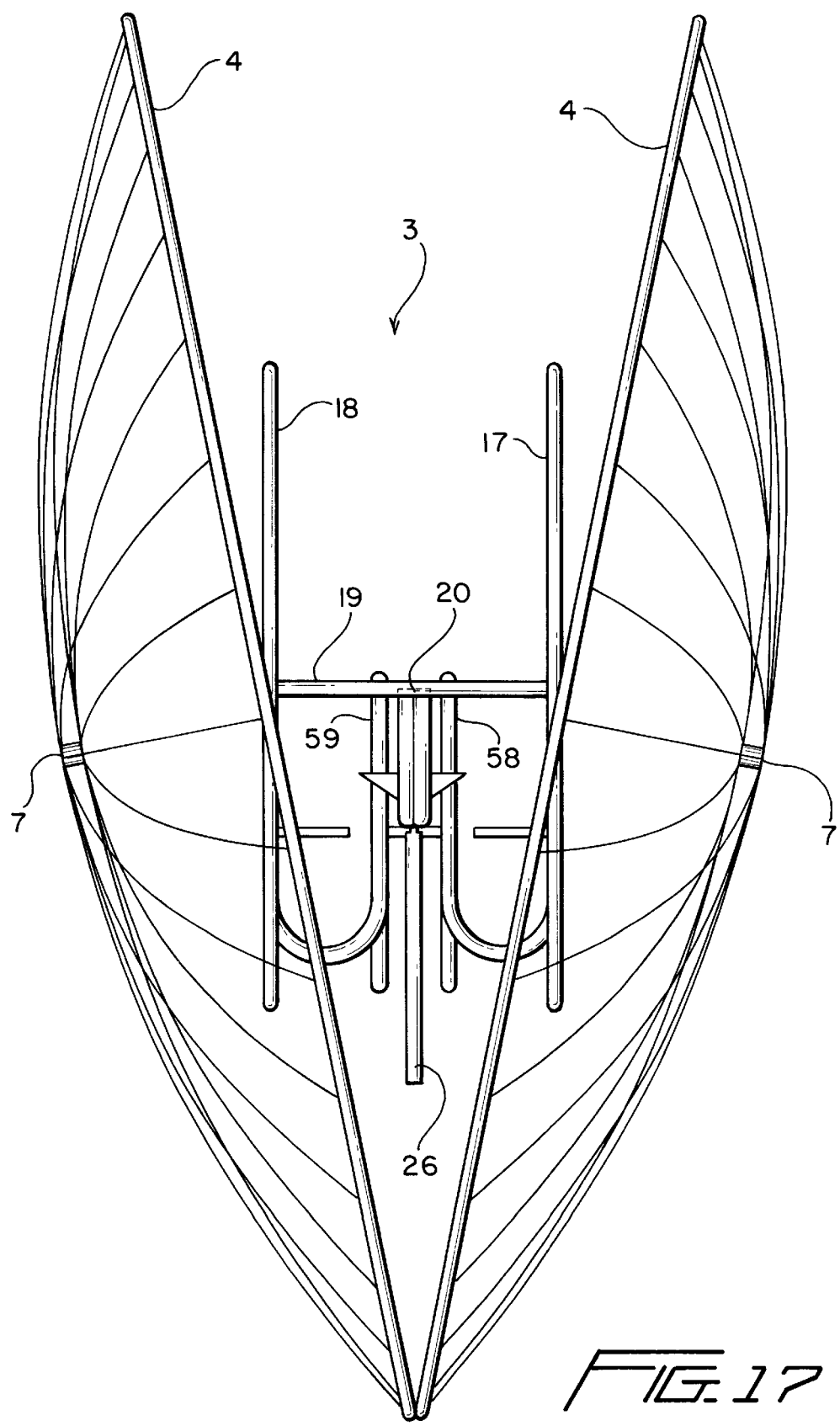
FIG. 17 is a front view of the preferred parallel vehicle of FIGS. 1–3 in which the camber and spacing of the wheels has been adjusted to achieve a V-shaped configuration.
Figure 18:
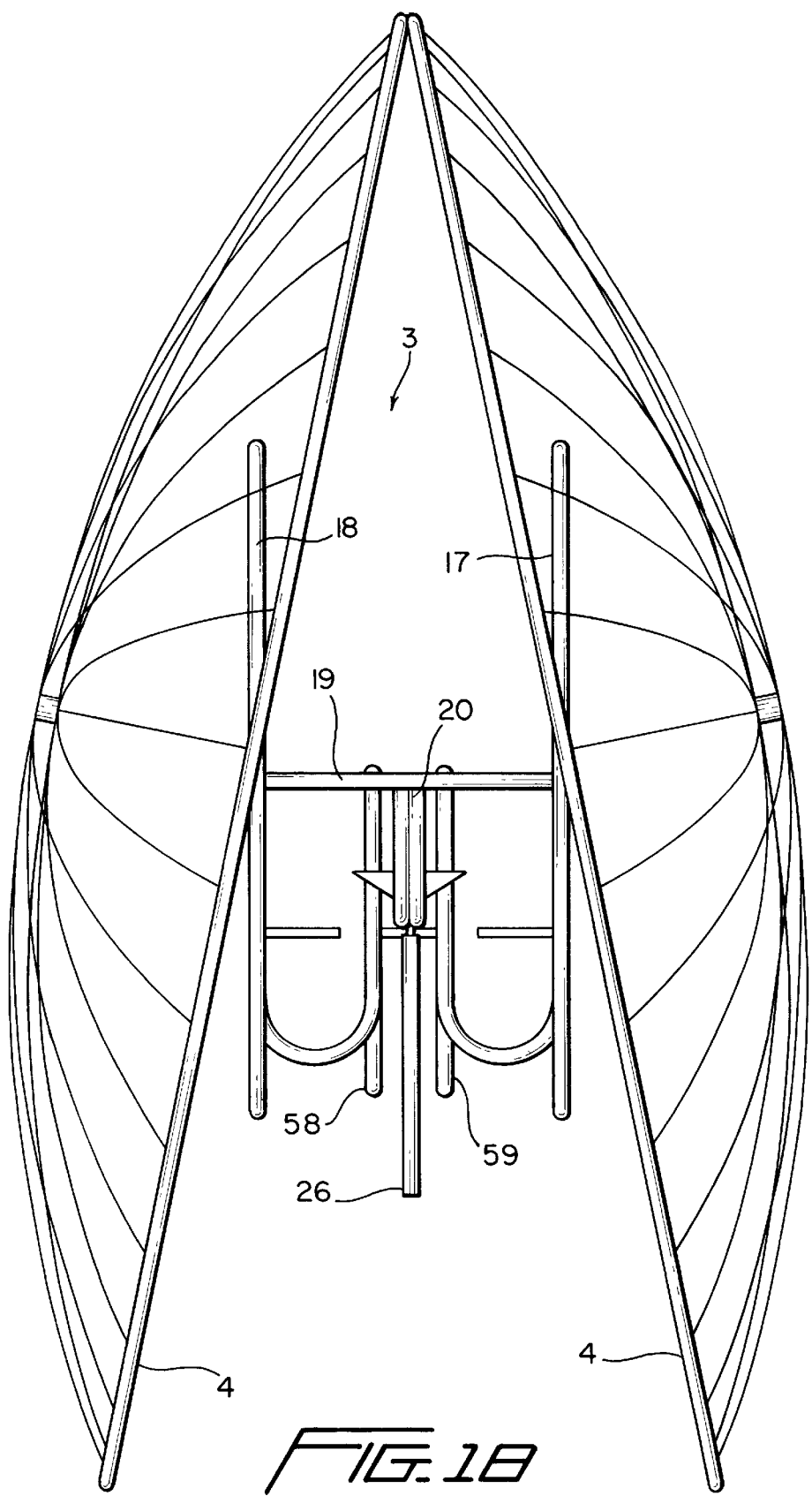
FIG. 18 is a front view of the preferred parallel vehicle of FIGS. 1–3 in which the camber and spacing of the wheels has been adjusted to achieve an inverted V-shaped configuration.
Figure 19:
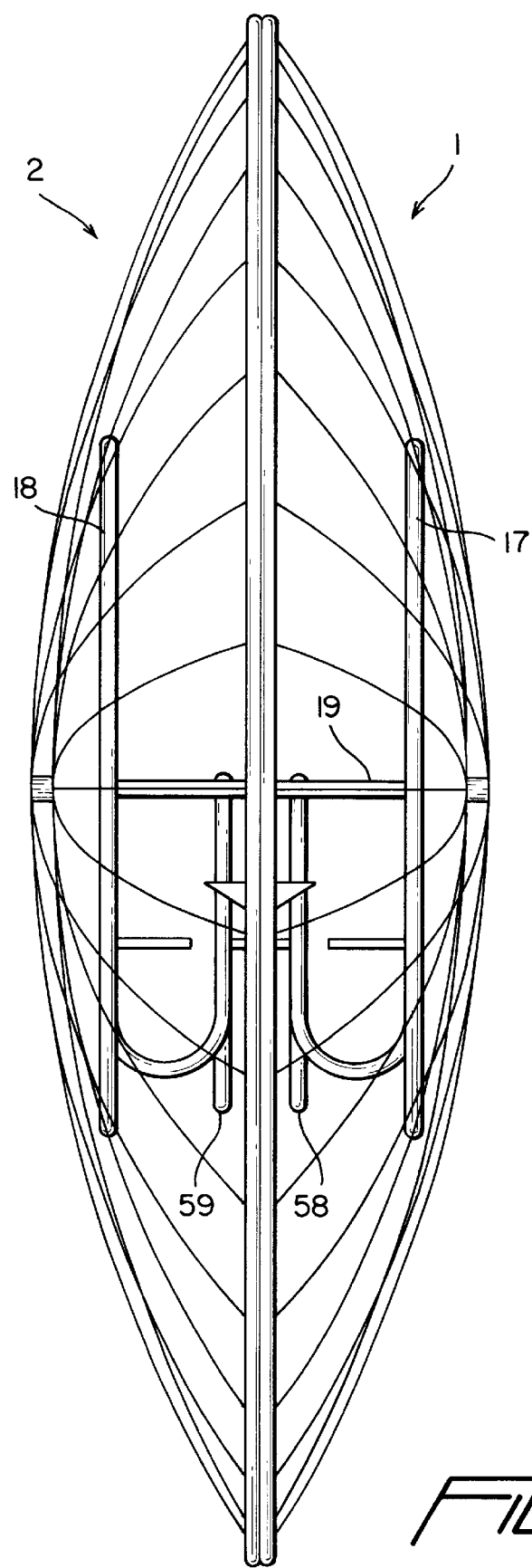
FIG. 19 is a front view of the preferred parallel vehicle of FIGS. 1–3 in which the wheels have been brought together to completely enclose the rider.

The wheel position control system is responsible for closing and opening the wheels, lifting and lowering the vehicle, and changing the camber of the wheels. This is accomplished in one embodiment of the invention by connecting four hydraulically operated suspension tubes or cylinder assemblies 61–64 between the wheel hubs 7 and stationary chassis 3, and by connecting four corresponding master control cylinder assemblies 65–68 between the handle assemblies 41 and the sub-chassis 57. Those skilled in the art will appreciate that by individually changing the relative position of the pistons 69 within the control cylinder assemblies 65–68, any desired wheel position can be achieved, including fully open, with positive or negative camber, fully closed, and in any intermediate position. FIGS. 17–19 illustrate, respectively, configurations in which the wheels form a V-shape, an inverted V-shape, and are fully closed.

The respective cylinder assemblies operate according to conventional hydraulic principles which are well understood by those skilled in the art of hydraulic control systems. Essentially, the master cylinder assemblies 65–68 connecting the handle assemblies 41 with the respective rings 58 and 59 of sub-chassis 57 have the same geometric configuration as the cylinder assemblies 61–64 which serve as slaves to the master cylinder assemblies 65–68, such that changes in length of the master cylinder assemblies are converted into corresponding changes in length of the slave cylinder assemblies, with the result that any changes in the relative position and orientation of handle assemblies 41 relative to sub-chassis members 58 and 59 will translate into corresponding changes in relative position and orientation between hub assemblies 7 and main chassis members 17 and 18. Preferably, the cylinders connected between the chassis and the stationary portion of the wheel hub have a volume per unit length which is less than that of the control cylinders actuated by the rider, and thus smaller motions of the control cylinders become larger motions of the support cylinders, although it will also be appreciated by those skilled in the art that the provision of, for example, a 2:1 ratio between the master control cylinders and the slave cylinders is not necessary and that a 1:1 or any other desired ration could be used.

Figure 4:
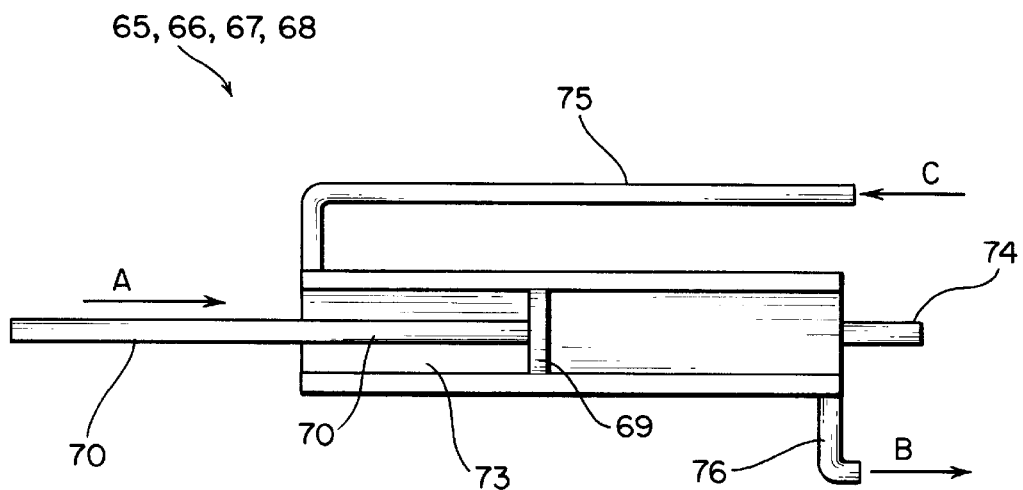
FIG. 4 is a cutaway view of a master cylinder for use in the preferred parallel vehicle illustrated in FIGS. 1–3.

As shown in FIG. 4, each control cylinder assembly 65–68 includes a piston 69 connected to a piston rod 70 which in turn is attached to the cross member 71 on the frame member 72 of one of the handle assemblies 41. The cylinders 73 in which the pistons are fitted are fixedly attached via bars 74 to the respective sub-chassis members 17 and 18 and have extending therefrom hydraulic tubing carried by conduits 75 and 76 which permit fluid to move between the control cylinder assemblies 65–68 and slave cylinder assemblies 61–64 when the pistons 69 (schematically represented as disks) and piston rods 70 of the control cylinder assemblies are moved in response to movement of the handle assemblies 41.

Figure 5:
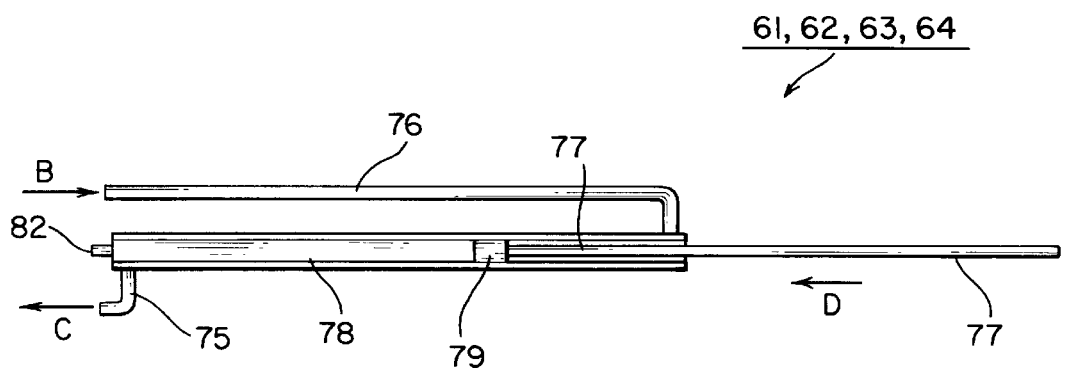
FIG. 5 is a cutaway view of a slave cylinder for use in the preferred parallel vehicle illustrated in FIGS. 1–3.

As shown in FIG. 5, the slave cylinder assemblies 61–64 are similar to the hand operated master cylinder assemblies. The exact amount of movement of the piston rod 77 in relation to the length of each cylinder 78 may be adjusted by using a dual piston assembly 79. Because, as is best seen in the side view of FIG. 3, the four slave cylinders are arranged around the periphery of the chassis at 90° intervals, the hydraulic tubing 75 and 76 for the respective cylinders is preferably carried by a master conduit 83 within or around the annular chassis members 17 and 18, which are connected to the cylinders 78 by bars 82. While the use of a circular chassis and circular control members is not necessarily critical, by making them circular, it is much easier to achieve the symmetry necessary to provide an intuitive correspondence between movement of the handle assemblies and movement of the wheels.

The handle assemblies 41 each include a diametrically situated handle 84 which is gripped by the rider so that by simply moving his or her hands as they grip the handles, the frame members 72 are moved to cause corresponding movements of the cross member 71, piston rods 70, and pistons 69, indicated by arrow A, which in turn respectively pushes and pulls hydraulic fluid in conduits 75 and 76, indicated by arrows B and C, and causes corresponding movements of the pistons 79, piston rods 77, non-rotating hub members 8, and wheels 1 and 2, as indicated by arrow D. Control of the vehicle is thus achieved by moving the handles 84 in exactly the manner in which the wheels are to be relatively moved such that, for example, by moving the handles closer together, the wheels will also be moved closer together, by tilting one handle relatively to the other, the corresponding wheel will also be tilted, by raising one handle, the corresponding wheel will also be raised, and so forth.

Figure 7:
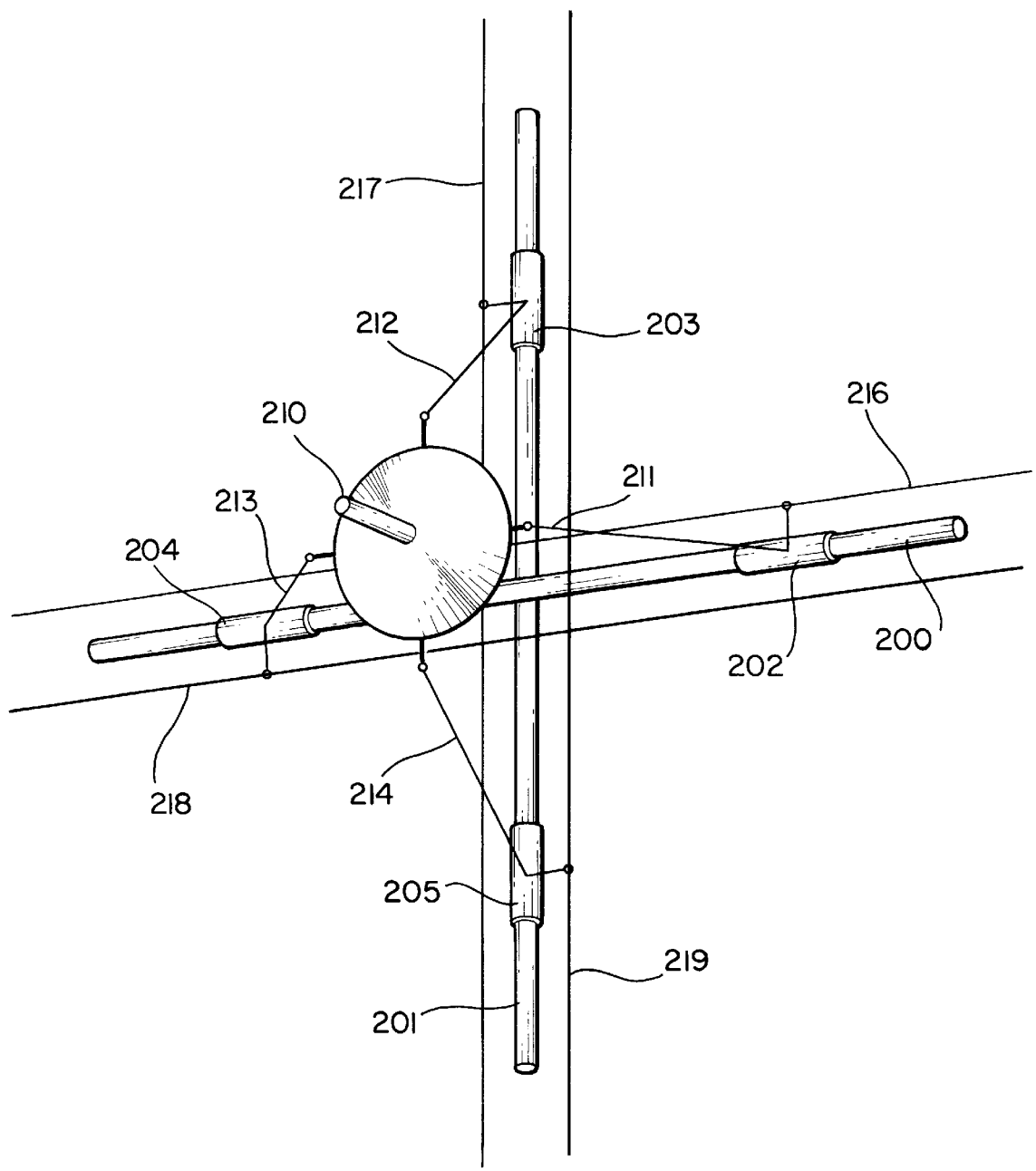
FIG. 7 is a schematic illustration of the master portion of an alternative wheel position control arrangement for the parallel vehicle of the invention.
Figure 8:
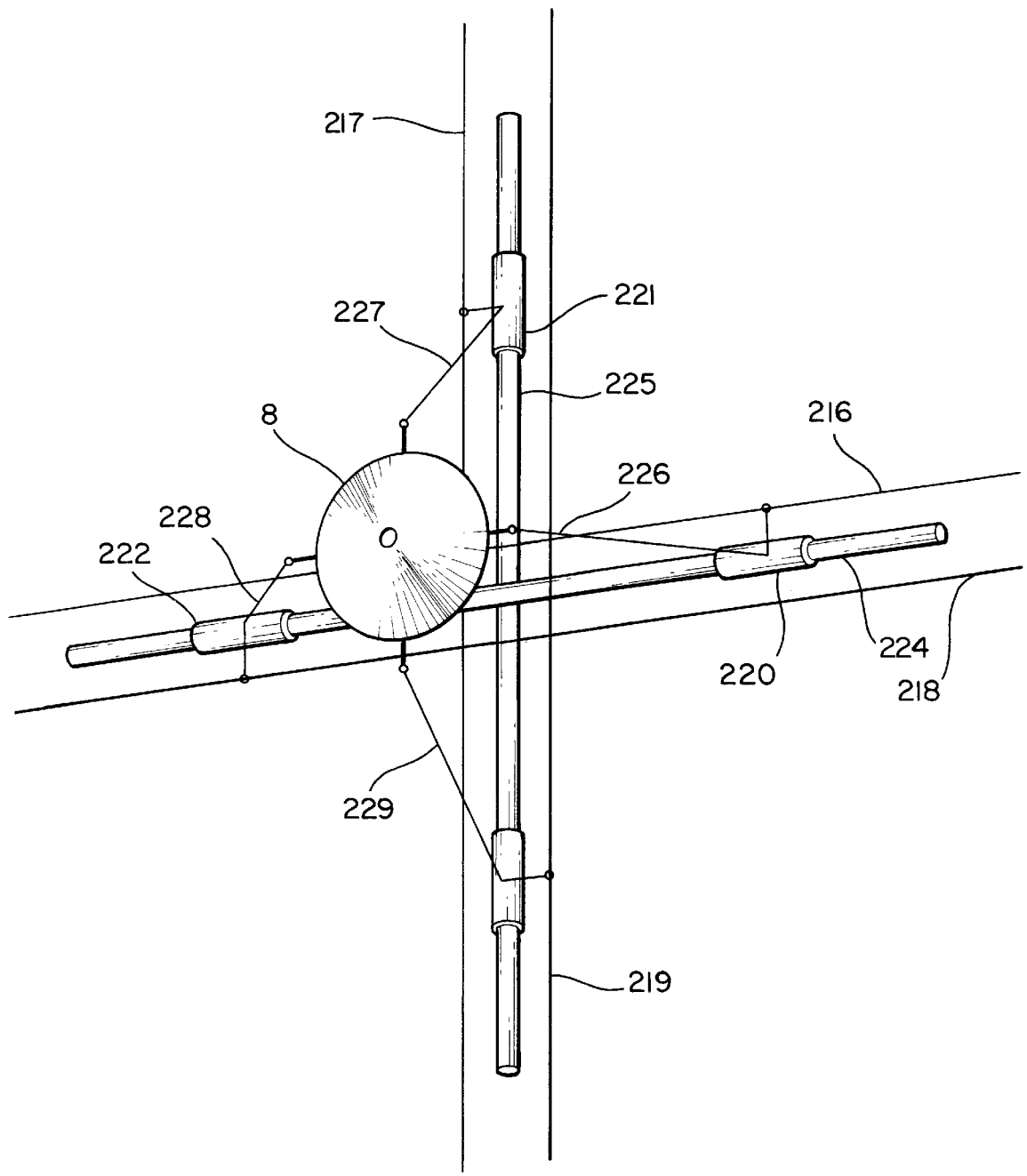
FIG. 8 is a schematic illustration of the slave portion of the alternative wheel position control arrangement shown in FIG. 7.

FIGS. 7 and 8 illustrate an alternative wheel position control arrangement in which the hydraulic system is replaced by a wire-based system. FIG. 7 illustrates the master portion of the alternative wheel position control system and FIG. 8 illustrates the slave portion. In this embodiment, the sub-chassis includes a pair of crossbars 200 and 201 on which are positioned four bearing sleeves 202–205 arranged to slide along the crossbars. The bearing sleeves are attached to a handle member 210 via rods 211–214 that are pivotal with respect to both the handle member 210 and the bearing sleeves 202–205 such that the sleeves will follow projections of the position of the handle member along the two axes defined by crossbars 200 and 201. Each of the bearing sleeves is attached to a single wire 216–219, which in turn are connected to corresponding bearing sleeves 220–223 of the slave system which moves the wheels. Bearing sleeves 220–223 are slidable on crossbars 224 and 225 attached to the chassis and connected via pivotally mounted rods 226–229 to the non-rotatable portion 8 of wheel hub 7.

Those skilled in the art will appreciate that bearing sleeves 202–205 and rods 206–209 are analogous to hydraulic cylinder assemblies 65–68 of the first embodiment of the invention, that sleeves 220–223 and rods 226–229 are analogous to hydraulic cylinder assemblies 61–64, and that wires 216–219 correspond to conduits 75 and 76. The principle functional difference between this embodiment of the invention and the first illustrated embodiment is that because of the mechanical linkage, a one-to-one ratio between movement of the handle relative to the sub-chassis and movement of the wheel hub relative to the chassis is obtained, whereas when hydraulic cylinders are used, the ratio of movements can easily be varied by varying the volume per unit length in the interior of the cylinders.

Figure 9:
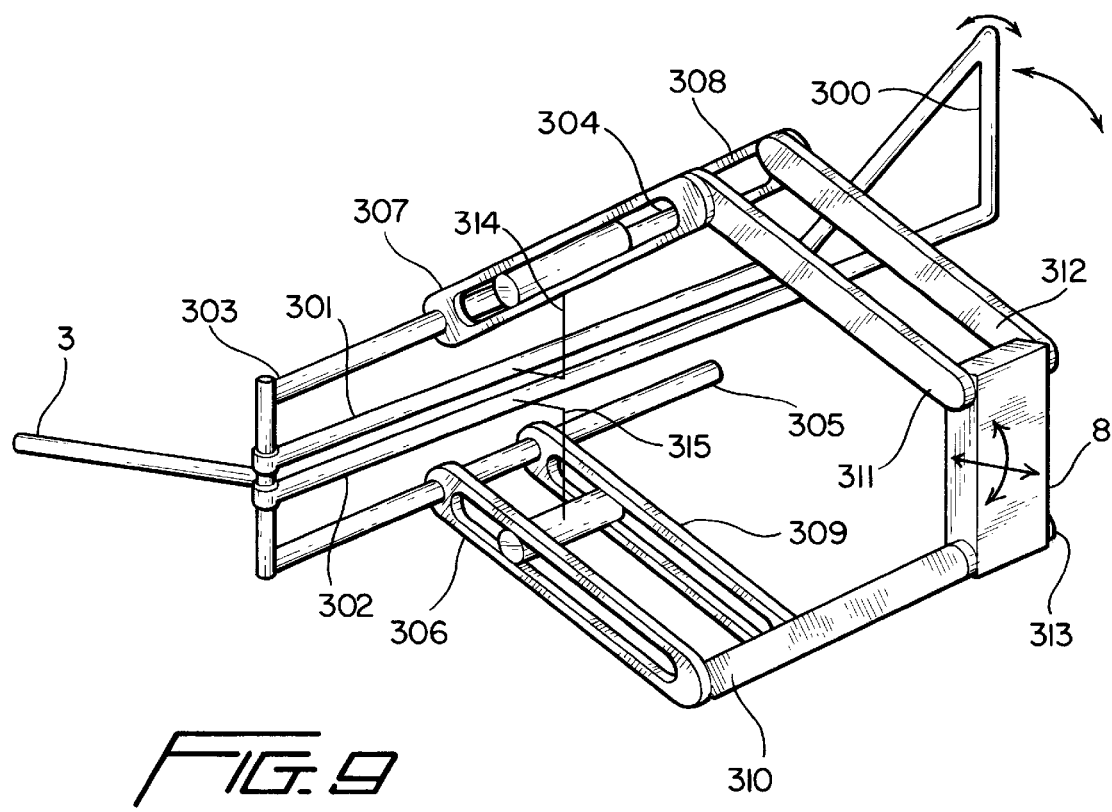
FIG. 9 is a perspective view of a second alternative wheel position control arrangement for the parallel vehicle of the invention.
Figure 10:
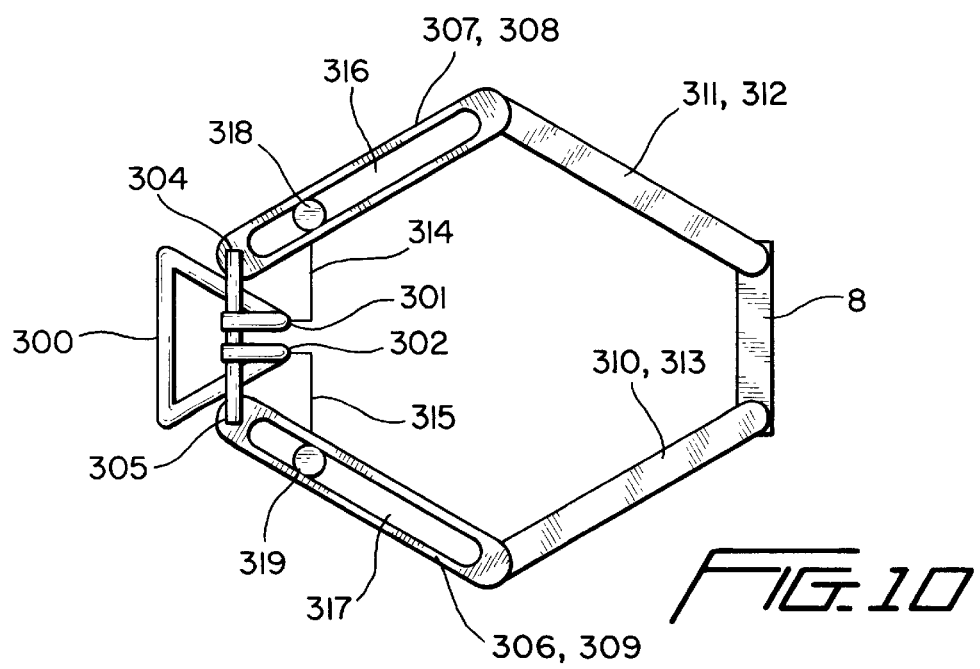
FIG. 10 is a plan view of the second alternative wheel position control arrangement illustrated in FIG. 9.

Yet another alternative wheel position control arrangement is illustrated in FIG. 9. In this arrangement, a direct rather than master/slave arrangement is used to cause the non-rotatable wheel hub member 8 (schematically represented) to move in response to movement of a control handle 300. Control handle 300 includes two parallel members 301 and 302 pivotally connected to a U-shaped member 303 having arms 304 and 305, which in turn is pivotally connected to chassis 3 to enable the handle 300 to be moved by the rider in the same manner as the handle assembly of the first embodiment of the invention, i.e., in a direction to move the wheels together or in a direction to tilt the wheel corresponding to the handle. In this embodiment, hub member 8 is connected to the U-shaped member 303 by a parallelogram linkage consisting of members 306–313 pivotally connected in pairs respectively to each other, to the hub member 8, and to the arm 304 and 305 of member 303. Movement of the linkage is provided by control members 314 and 315 fixedly connected to members 301 and 302 of the handle 300, each of the control members including a cross-arm 318 and 319 which extends through slots 316 and 317 in a respective pair of parallelogram linkage members 306,307 and 308,309 such that when handle 300 is moved, cross-arms 318 and 319 will travel along slots 316 and 317, thereby moving respective arm pairs 306,309 and 307,308 to effect the desired translation of the wheel hub.

Because of the manner in which the wheels 1 and 2 can be pulled together, in an especially preferred embodiment of the invention, the pedals 25, primary gear mechanism 24, secondary gear mechanism 27, and gear boxes 11 are all pivotally suspended from pivot 21, as mentioned above, and further are caused to pivot in response to pedaling such that when one of the pedals 25 is at the lowest point of its travel, it is positioned at the center of the vehicle midway between the spokes of the two wheels. This is accomplished, as illustrated in FIG. 13, by mounting two rods 86 and 87 in parallel with pedal support 22 such that they engage a pair of cam members 88 and 89 which rotate with the pedal axis. The shape of the cam members 88 and 89 is such that a corresponding rod 86,87 is moved upwards as the corresponding pedal reaches the lowest point in its rotation, forcing the entire assembly pivot around the pivot axis provided by pivot 21, with the pedal thereby moving toward the mid-plane of the parallel wheels and out of the way of the spokes.

The final subsystem of the preferred parallel vehicle is the main braking system, which includes two subsystems. The first subsystem distributes the braking force from caliper-type brake handles 90, mounted on a crossbar 19 in each of the handle assemblies 41 to the braking mechanism 14 via a distributor 93, illustrated in FIG. 15, and wire 94 and 95. This subsystem causes the brakes to be actuated at the same time for even braking of the vehicle, regardless of the force applied to the left and right side brake handles 92. The other subsystem is activated by movement of the wheel position control handles 84 which, if moved in a direction to lower one of the wheels, pulls on a wire 96 attached thereto in order to activate the brake on the side on which the pulled handle is located, to brake the corresponding single wheel. Handle assembly 41 is illustrated in detail in FIGS. 14A and 14B.

The braking force distributor shown in FIG. 15 includes a housing 97 mounted to the chassis and including /six stationary posts 98–103 and three movable posts 104–106. The respective wires 94 leading from brake handles 90 via conduits 107 for the two wheels enter through first openings and are connected to respective ones 104 and 105 of the movable posts to form the braking force inputs. The output wire 95 is connected straight between two additional openings in housing 97, while the third movable post 106 is situated on the opposite side of the output wire 95 from the first two movable posts 104 and 105. A pair of force distribution strings 207 and 208 is attached to the sides of the housing adjacent the first two movable posts and wraps around movable posts 104 and 105 and stationary posts 98–101, and finally around the third movable post 106. In operation, when either or both of the two input wires 94 are moved, the corresponding first and second movable posts 104 and 105 are moved a corresponding distance, which in turn moves the distribution strings 207 and 208 and pulls the third movable post 106 against the output wire 95, causing a force to be applied to the output wire 95 that is equal to the sum of the forces on first two movable posts 104 and 105.

As a result of the above two subsystems, application of a force to either of the two brake handles 90 will pull on wire 94 and consequently, because of distributor 93, on each of the wires 95 corresponding to the two wheels, while application of an appropriate force to wheel position control handle 84 will cause a wire 96 to be pulled on just side corresponding to the handle which is moved. In order to transmit the output of the distributor, and the direct input provided by handle 84, to the brake mechanisms 14, wires 95 and 96 in conduits 107 and 108 are joined at junctions 109 and run as single wires 110 to the brake mechanisms 14. Single wires 110 are thus moved in response to forces on either wires 95 or 96 depending on which braking subsystem has been actuated.

The brake mechanism 14 is described in much greater detail in copending application Ser. No. 08/407,079, filed Mar. 20, 1995, and incorporated herein by reference. The principal components of the brake mechanism are the input shaft 111, which is connected to drive gear 10 of hub 7 and therefore rotates therewith, a control member 112 having an elliptical cross-section at a first end 113 and a circular cross-section at the second end 114, non-rotating bearing members 115 and 116 at each end of the control member 112, cam followers 117, elongated brake shoe supports 118, pivots 119, and brake shoes 16. A pair of return springs 120 are connected between the housing 121 and bearing member 115 to bias the control member in such a manner that the smaller circular end of the control member is presented to the cam followers 117. Wire 110 is connected to the other bearing member 116 such that whenever wires 95 and 96 are pulled in direction E in response to movement of handles 90 or 84, thereby pulling wire 110, the control member 112 is pulled in direction F against the bias provided by springs 120, causing the larger elliptical portion of the control member to be presented to the cam followers 117, which in turn causes elongated members 118 to oscillate in the direction of arrow G around pivots 119 against the force of bias spring 122 as the control member rotates in direction H, thereby causing brake shoes 16 to engage brake disk 15 at a frequency which depends on the rate of rotation of input shaft 111 and a pressure which depends on the force applied to wire 110 by wires 95 and 96. It will of course be appreciated by those skilled in the art that, while the antilocking effect provided by the oscillations of the brake shoes 16 increases the safety of the vehicle occupant, the use of antilock brakes is not required for purposes of the invention, and that to the contrary any suitable cable or hydraulically operated braking system may be substituted for the illustrated system.

In addition to providing different braking systems, those skilled in the art will appreciate that each of the other systems described above, including the wheel positioning and propulsion systems, could be varied by those skilled in the art without departing from the spirit of the invention, and that in addition each of the individual components of the systems described above, and the manner in which they are combined, could also possibly be varied without departing from the invention while, conversely, some of the principles of the invention could be applied to vehicles other than parallel vehicles. For example, the above described systems and components could be mounted in a single concave wheel with the center of mass of the rider positioned above the wheel tire and the rider providing support for the vehicle when it is stopped. Alternatively, two semicircular concave wheels which, when brought together, would form a single wheel, could be substituted for the illustrated circular concave wheels (those skilled in the art will note, however, that a two-wheel configuration in which the wheels have a circumference of less than 180° would be impossible since one point on one of the wheels must touch the ground at all times). Furthermore, the illustrated vehicle design, as well as each of the alternative designs, could include a motor in addition to or in place of the pedal propulsion system, with the position of the rider being adjusted to compensate for the mass of the motor, possibly allowing for smaller wheel diameters, or with the rider being completely dispensed with and the vehicle operated as a remote control vehicle or toy. Finally, the parallel vehicle could be reduced in size, attached to shoes at a position corresponding to the chassis of the illustrated vehicle, and used as a roller skate (without the wheel position control, propulsion, steering, or braking systems).

In view of the numerous possible variations and modifications of the invention, only a few of which are described above, it is therefore intended that the invention should not be limited by the illustrated embodiment, but rather should be defined solely by the appended claims in accordance with the applicable rules of claim interpretation.

I claim:
1. In a parallel vehicle comprising:
a pair of wheel hubs;
only two side-by-side wheels attached to the parallel vehicle, each rotatably mounted on a respective one of said wheel hubs such that said vehicle includes no wheels other than the two side-by-side wheels; and
an assembly to which said only two side-by-side wheels are rotatably mounted, said assembly including:
a chassis having two sides;
means for connecting the hubs to the chassis such that said hubs are non-rotatable with respect to said chassis;
a support structure positioned between the two sides of the chassis and below a center line connecting the wheels; and
propulsion means depending from said support structure for causing rotation of the wheels relative to said hubs to propel said vehicle, the improvement wherein:
said means for connecting the hubs to the chassis include first and second wheel position control means for changing a relative distance between respective ones of said wheels and the chassis by changing a distance between at least one of said hubs and said chassis during said rotation of said wheels.

2. A vehicle as claimed in claim 1, wherein said first and second wheel position control means further comprise means for changing a relative camber angle between said wheels and said chassis.

3. A vehicle as claimed in claim 2, wherein said first and second wheel position control means each comprises a mechanism connected between one of the wheel hubs and the chassis, a control handle, and means for transmitting movements of the control handle to the mechanism to cause the mechanism to vary the distance and orientation of the respective hub relative to the chassis.

4. A vehicle as claimed in claim 3, further comprising a subchassis and means for permitting a rider supported by the support structure to move the control handle relative to the subchassis, wherein said hubs are arranged to move relative to the chassis in the same manner as the control handle is moved relative to the subchassis.

5. A vehicle as claimed in claim 4, wherein said mechanism comprises a plurality of first hydraulic cylinder assemblies, each including a cylinder, a piston in the cylinder, and a piston rod, one of said cylinder and said piston rod being connected to the wheel hub and the other of said cylinder and piston rod being connected to the chassis.

6. A vehicle as claimed in claim 5, wherein said means for a rider to move the control handle relative to the subchassis comprises a plurality of second hydraulic cylinder assemblies, each including a cylinder, a piston in the cylinder, and a piston rod, one of said cylinder and said piston rod being connected to the control handle, and the other of said cylinder and said piston rod being connected to the subchassis, said first and second cylinder assemblies being connected to each other by conduits for carrying hydraulic fluid.

7. A vehicle as claimed in claim 6, wherein a number of said first hydraulic cylinder assemblies is four and a number of said second hydraulic cylinder assemblies is also four, wherein a geometric arrangement of the four first cylinder assemblies is the same as a geometric arrangement of the second cylinder assemblies, and wherein said conduits connect respective cylinder assemblies having a same orientation and position in said geometric arrangement.

8. A vehicle as claimed in claim 7, wherein the cylinders of said first and second cylinder assemblies have different internal diameters and lengths, whereby movement of one of the pistons of the first cylinder assemblies causes a larger movement of one of the second cylinder assemblies.

9. A vehicle as claimed in claim 6, wherein said chassis and subchassis each include a pair of circular members constructed of hollow tubing.

10. A vehicle as claimed in claim 3, wherein said mechanism comprises a pair of crossbars on the chassis, four first cylinders slidable on the crossbars, and rods having one end pivotally connected to the first cylinders and a second end pivotally connected to the respective wheel hub.

11. A vehicle as claimed in claim 10, further comprising a pair of crossbars on a subchassis, four second cylinders slidable on the crossbars on the subchassis, and rods having one end pivotally connected to the second cylinders and a second end pivotally connected to the control handle, and wherein said means for transmitting movements of said control handle to said mechanism comprise wires connected between respective ones of said first and second cylinders.

12. A vehicle as claimed in claim 3, wherein said mechanism comprises a parallelogram linkage between a U-shaped member and the respective wheel hub, and wherein said means for transmitting movements of said handle to the mechanism comprises a pair of extensions of said handle to which the U-shaped member is pivotally connected, and means including a crossbar attached to each of said pair of extensions and slidable in grooves in respective members of said parallelogram linkage.

13. A vehicle as claimed in claim 2, wherein said propulsion means comprises a pedal mechanism arranged to convert movement of a rider supported by said support structure into said rotation of said wheels.

14. A vehicle as claimed in claim 13, wherein said pedal mechanism comprises an output shaft, said output shaft forming an input to a pair of clutch/reversing mechanisms, each of said clutch/reversing mechanisms having a respective output to one of said wheels.

15. A vehicle as claimed in claim 14, wherein each of said clutch reversing mechanisms comprises an input gear having teeth extending perpendicular to a plane of said input gear, a second gear engageable with said teeth, and means for moving said second gear diametrically across the input gear to engage teeth on diametrically opposite sides of said input gear to thereby change a direction of rotation of said second gear, said second gear being connected to a drive gear in a wheel hub to cause said wheel to rotate in a same direction as said second gear.

16. A vehicle as claimed in claim 15, wherein said second gear is connected to the drive gear by means of a cable having a worm gear at one end, said worm gear engaging said drive gear.

17. A vehicle as claimed in claim 15, wherein said means for moving said second gear comprises a wire connected between said second gear and a handle arranged to be moved by the rider.

18. A vehicle as claimed in claim 14, wherein said pedal mechanism comprises a first set of gears connected to a second set of gears by a chain, and derailleur means for selecting individual gears of said first and second sets of gears to change a common gear ratio between said pedal mechanism and said wheels.

19. A vehicle as claimed in claim 14, wherein said pedal mechanism and said clutch/reversing mechanisms are mounted to a common pivot, and further comprising means for causing said pedal mechanism and clutch mechanism to pivot from side to side in response to rotation of said wheels such that when a pedal reaches a lowest point in its travel, the pedal is positioned centrally between said wheels.

20. A vehicle as claimed in claim 19, wherein said means for causing said side to side pivoting comprises a pair of cam members arranged to rotate with said pedals, and a pair of cam followers connected to said common pivot.

21. A vehicle as claimed in claim 20, wherein said pedal mechanism comprises a first set of gears connected to a second set of gears by a chain, and derailleur means for selecting individual gears of said first and second sets of gears to change a common gear ratio between said pedal mechanism and said wheels.

22. A vehicle as claimed in claim 13, further comprising a seat mounted on a member extending from a crossbar extending across said chassis, and wherein said pedal mechanism depends from a pivot on said crossbar, and further comprising means for causing said pedal mechanism and to pivot from side to side in response to rotation of said wheels such that when a pedal reaches a lowest point in its travel, the pedal is positioned at a centrally between said wheels.

23. A vehicle as claimed in claim 22, wherein said means for causing said side to side pivoting comprises a pair of cam members arranged to rotate with said pedals, and a pair of cam followers connected to said common pivot.

24. A vehicle as claimed in claim 2, further comprising a braking mechanism on each of said wheels, said braking mechanism forming a means for braking a respective wheel individually and thereby steer said vehicle.

25. A vehicle as claimed in claim 24, wherein each said braking mechanism is actuated by one of a pair of first brake actuators, each including a wire connected to a control handle movable by the rider to thereby brake said wheels individually and thereby steer said vehicle.

26. A vehicle as claimed in claim 25, wherein said control handle also serves as a control handle for determining a position and orientation of a respective wheel relative to said chassis.

27. A vehicle as claimed in claim 26, further comprising a pair of second brake actuators, and distribution means for distributing a force applied to either of said second brake actuators equally to each of said wheels to thereby brake said vehicle.

28. A vehicle as claimed in claim 27, wherein said distributor means is connected to said brake mechanisms by respective second wires, each of said second wires being connected to one of said first wires.

29. A vehicle as claimed in claim 28, wherein said distributor comprises a pair of movable members respectively connected to said second brake actuators by third wires, a single movable member connected to said second wires, and means including a string for causing said single movable member to move in response to movement of either movable member of said pair of movable members.

30. A vehicle as claimed in claim 24, further comprising a pair of brake actuators, and means for distributing a force applied to either of said brake actuators equally to each of said wheels to thereby brake said vehicle.

31. A vehicle as claimed in claim 30, wherein said distributor comprises a pair of movable members respectively connected to said second brake actuators by first wires, a single movable member connected to said braking mechanism by second wires, and means including a string for causing said single movable member to move in response to movement of either movable member of said pair of movable members.

32. A vehicle as claimed in claim 24, wherein each said braking mechanism comprises an axially movable control member and a pair of cam followers attached to a pair of brake shoes, wherein axial movement of said control member causes said brake shoes to engage said brake disk, and wherein said control member is connected by a wire to means for actuating said brake.

33. A vehicle as claimed in claim 32, wherein said means for actuating said brake comprises individual control handles respectively connected to said wire from one of said braking mechanisms, and second brake actuators connected to said wire via a braking force distributor which distributes equally to said brake mechanisms a force applied to either of said second brake actuators.

34. A vehicle as claimed in claim 32, wherein said each brake mechanism further comprises means for causing said control member to rotate in response to rotation of a respective one of said wheels, and wherein said control member has a circular cross section at one end and an elliptical cross section at a second end such that said brake shoes are caused to oscillate at a frequency of rotation of said respective one of said wheels when said control member is moved by said wire such that the second end of said control member is engaged by said cam follower, to thereby provide an antilock braking effect.

35. A vehicle as claimed in claim 2, wherein said wheels have a concave shape as viewed by a rider situated in said vehicle.

36. In a parallel vehicle comprising:
a pair of wheel hubs;
only two side-by-side wheels attached to the parallel vehicle, each rotatably mounted on a respective one of said wheel hubs such that said vehicle includes no wheels other than the two side-by-side wheels; and
an assembly to which said only two side-by-side wheels are rotatably mounted, said assembly including:
a chassis having two sides;
means for connecting the hubs to the chassis such that said hubs are non-rotatable with respect to said chassis;
a support structure positioned between the two sides of the chassis and below an unloaded center of gravity of the vehicle; and
propulsion means depending from said support structure for causing rotation of the wheels relative to said hubs to propel said vehicle, the improvement wherein:
said means for connecting the hubs to the chassis include first and second wheel position control means for changing a relative camber angle between respective ones of said wheels and said chassis during said rotation of said wheels.

37. A parallel vehicle as claimed in claim 36, wherein each of said wheels has a concave shape viewed from the point of view of a rider situated in the vehicle.

38. In a parallel vehicle comprising:
a pair of wheel hubs;
only two side-by-side wheels attached to the parallel vehicle, each rotatably mounted on a respective one of said wheel hubs such that said vehicle includes no wheels other than the two side-by-side wheels; and
an assembly to which said only two side-by-side wheels are rotatably mounted, said assembly including:
a chassis having two sides;
means for connecting the hubs to the chassis such that said hubs are non-rotatable with respect to said chassis;
a support structure positioned between the two sides of the chassis and below a center line connecting the wheels; and
propulsion means depending from said support structure for causing rotation of the wheels relative to said hubs to propel said vehicle, the improvement wherein:
said propulsion means comprises a pedal mechanism including an output shaft, said output shaft forming an input to a pair of clutch/reversing mechanisms, each of said clutch/reversing mechanisms having a respective output to said at least one wheel and each of said clutch/reversing mechanisms including means for independently reversing a direction of rotation of a respective one of said wheels such that the respective one of said wheels is driven in a direction opposite to a direction of rotation at which the other of said only two wheels is driven in response to rotation of said pedal mechanism in a single direction.

39. A vehicle as claimed in claim 38, wherein said clutch/reversing mechanisms comprises an input gear having teeth extending perpendicular to a plane of said input gear, a second gear engageable with said teeth, and means for moving said second gear diametrically across the input gear to engage teeth on diametrically opposite sides of said input gear to thereby change a direction of rotation of said second gear, said second gear being connected to a drive gear in a wheel hub to cause said at least one wheel to rotate in a same direction as said second gear.

40. A vehicle as claimed in claim 39, wherein said second gear is connected to the drive gear by means of a cable having a worm gear at one end, said worm gear engaging said drive gear.

41. A vehicle as claimed in claim 39, wherein said means for moving said second gear comprises a wire connected between said second gear and a handle arranged to be moved by the rider.

42. A vehicle as claimed in claim 39, wherein said pedal mechanism comprises a first set of gears connected to a second set of gears by a chain, and derailleur means for selecting individual gears of said first and second sets of gears to change a gear ratio between said pedal mechanism and said at least one wheels.

43. A vehicle as claimed in claim 38, wherein said pedal mechanism and said clutch/reversing mechanisms are mounted to a common pivot, and further comprising means for causing said pedal mechanism and clutch mechanism to pivot from side to side in response to rotation of said at least one wheel such that when a pedal reaches a lowest point in its travel, the pedal is positioned at away from said at least one wheel.

44. A vehicle as claimed in claim 43, wherein said means for causing said side to side pivoting comprises a pair of cam members arranged to rotate with said pedals, and a pair of cam followers connected to said common pivot.

45. A vehicle as claimed in claim 44, wherein said pedal mechanism comprises a first set of gears connected to a second set of gears by a chain, and derailleur means for selecting individual gears of said first and second sets of gears to change a common gear ratio between said pedal mechanism and said at least one wheel.

46. A vehicle as claimed in claim 38, further comprising a seat mounted on a member extending from a crossbar extending across said chassis, and wherein said pedal mechanism depends from a pivot on said crossbar, and further comprising means for causing said pedal mechanism and to pivot from side to side in response to rotation of said wheels such that when a pedal reaches a lowest point in its travel, the pedal is positioned away from said at least one wheel.

47. A vehicle as claimed in claim 46, wherein said means for causing said side to side pivoting comprises a pair of cam members arranged to rotate with said pedals, and a pair of cam followers connected to said common pivot.

48. A parallel vehicle as claimed in claim 36, further comprising a braking mechanism on each of said wheels, wherein each said braking mechanism is actuated by a first wire connected to a control handle movable by a rider to thereby brake said wheels individually and thereby steer said vehicle.

49. A vehicle as claimed in claim 48, wherein said control handle also serves as a control handle for determining said relative camber angle.

50. A vehicle as claimed in claim 49, further comprising a pair of second brake actuators, and means for distributing a force applied to either of said second brake actuators equally to each of said wheels to thereby brake said vehicle.

51. A vehicle as claimed in claim 50, wherein said distributor is connected to said brake mechanisms by respective second wires, each connected to one of said first wires.

52. A vehicle as claimed in claim 51, wherein said distributor comprises a pair of movable members respectively connected to said second brake actuators by third wires, a single movable member connected to said second wires, and means including a string for causing said single movable member to move in response to movement of either movable member of said pair of movable members.

53. A vehicle as claimed in claim 48, wherein each said braking mechanism comprises a brake disk an axially movable control member and a pair of cam followers attached to a pair of brake shoes, wherein axial movement of said control member causes said brake shoes to engage said brake disk, and wherein said control member is connected by a wire to means for actuating said brake.

54. A vehicle as claimed in claim 53, wherein said each brake mechanism further comprises means for causing said control member to rotate in response to rotation of a respective one of said wheels, and wherein said control member has a circular cross section at one end and an elliptical cross section at a second end such that said brake shoes are caused to oscillate at a frequency of rotation of said respective one of said wheels when said control member is moved by said wire such that the second end of said control member is engaged by said cam follower, to thereby provide an antilock braking effect.

55. A parallel vehicle as claimed in claim 36, further comprising a braking mechanism on each of said wheels, wherein said braking mechanism includes a pair of brake actuators, and means for distributing a force applied to either of said brake actuators equally to each of said wheels to thereby brake said vehicle.

56. A vehicle as claimed in claim 55, wherein said force distributing means comprises a pair of movable members respectively connected to said brake actuators by first wires, a single movable member connected to said braking mechanism by second wires, and means including a string for causing said single movable member to move in response to movement of either movable member of said pair of movable members.

57. A vehicle as claimed in claim 55, wherein each said braking mechanism comprises an axially movable control member and a pair of cam followers attached to a pair of brake shoes, wherein axial movement of said control member causes said brake shoes to engage said brake disk, and wherein said control member is connected by a wire to means for actuating said brake.

58. A vehicle as claimed in claim 57, wherein said each brake mechanism further comprises means for causing said control member to rotate in response to rotation of a respective one of said wheels, and wherein said control member has a circular cross section at one end and an elliptical cross section at a second end such that said brake shoes are caused to oscillate at a frequency of rotation of said respective one of said wheels when said control member is moved by said wire such that the second end of said control member is engaged by said cam follower, to thereby provide an antilock braking effect.

* * * * *